United States Patent [19]

Frantz

[11] 4,155,263
[45] May 22, 1979

[54] MULTIPLEXED STRAIN GAUGE BRIDGE

[75] Inventor: Robert G. Frantz, Glendale Heights, Ill.

[73] Assignee: Eaton Corporation, Cleveland, Ohio

[21] Appl. No.: 881,919

[22] Filed: Feb. 28, 1978

[51] Int. Cl.² ............................................. G01L 1/20
[52] U.S. Cl. .................................................. 73/771
[58] Field of Search ...................... 73/88.5 R, 771; 177/136, 211

[56] References Cited

U.S. PATENT DOCUMENTS

| | | | |
|---|---|---|---|
| 2,444,950 | 7/1948 | Nichols et al. | 73/88.5 R |
| 2,561,869 | 7/1951 | Kent | 73/88.5 R |
| 2,611,811 | 9/1952 | Yates | 73/88.5 R |
| 2,800,790 | 7/1957 | Schover | 73/88.5 R |
| 3,899,924 | 8/1975 | Klein | 177/136 |

Primary Examiner—Anthony V. Ciarlante
Attorney, Agent, or Firm—Blanchard, Flynn, Thiel, Boutell & Tanis

[57] ABSTRACT

A strain gauge load measuring system includes a pair of strain gauges mounted on each of one or more load supports, such as the axles of a vehicle. The strain gauges connect in a DC bridge circuit. A multiplexer comprises a pair of analog switches which alternately apply the voltage from respective bridge output terminals to an AC coupled amplifier, as a square wave voltage of amplitude equal to the difference between the voltages on the bridge output terminals. The amplified square wave voltage is applied across a meter as an amplified DC signal proportional to the DC bridge output signal, by a demultiplexer incorporating a further pair of analog switches cooperating with low pass filter elements. The demultiplexed DC signal across the meter is compared by an operational amplifier, having positive feedback for hysteresis, with the voltage on a variable voltage divider to determine when a threshold load value has been reached.

13 Claims, 3 Drawing Figures

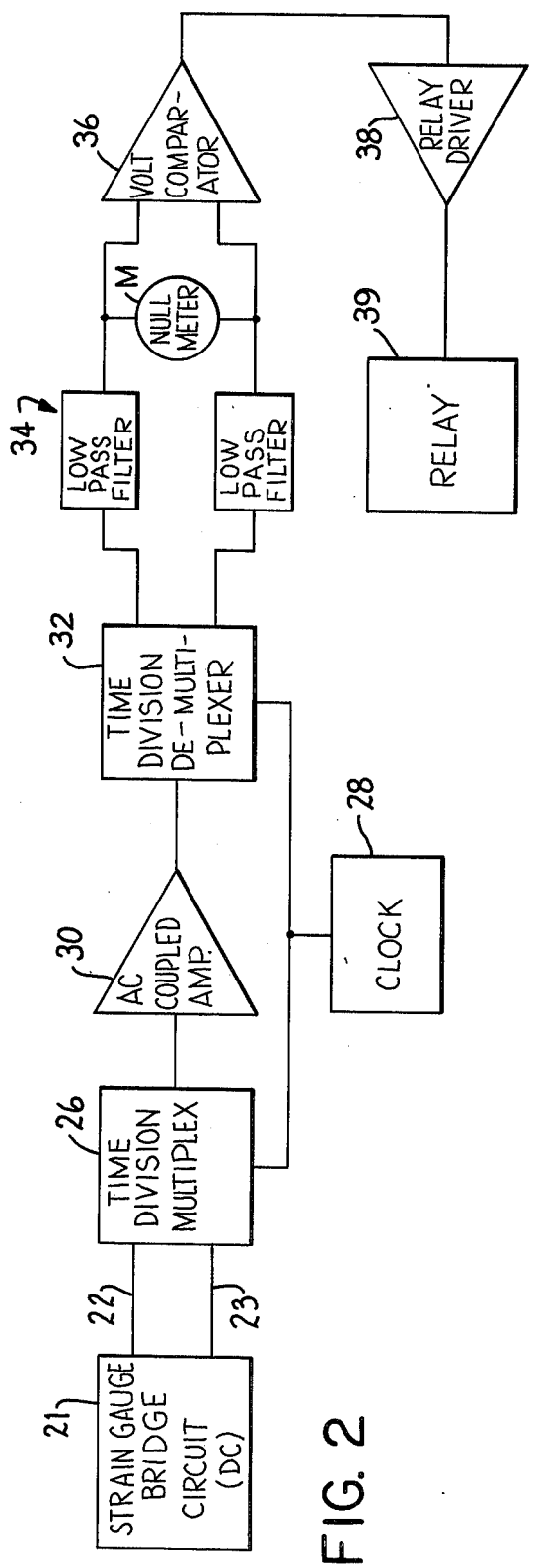
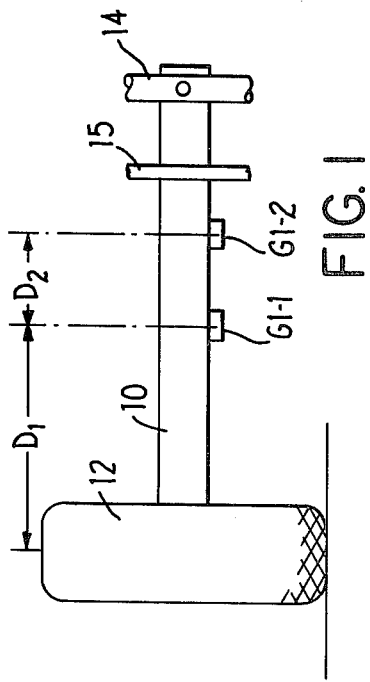
FIG. 2
FIG. 1

MULTIPLEXED STRAIN GAUGE BRIDGE

FIELD OF THE INVENTION

This invention relates to strain gauge load measuring systems, and particularly to such systems applicable to load carrying vehicles for furnishing a remote indication of the weight of the load carried by the vehicle.

BACKGROUND OF THE INVENTION

In earlier prior art, it was customary to use load cell systems for determining the total weight of loads supported by a vehicle, but such systems require special kinds of installation, which is not always convenient. Early strain gauge-type systems eased installation problems, but four strain gauges were initially required for each support member, (e.g. axle, trailer tongue, or the like) to produce the required signals.

In a subsequent advancement of the prior art, U.S. Pat. No. 3,899,924 (Klein), assigned to the assignee of the present invention, disclosed a strain gauge load measuring system requiring only two strain gauges per load support member. This prior art system employed, for a four axle vehicle, eight strain gauges arranged in a pair of bridges energized from independent square wave voltage sources. The output terminals of such bridges were connected serially between ground and a bucking voltage supply energized by a third independent square wave voltage supply. The resulting difference voltage, a function of the net load weight carried by the vehicle, was amplified and then applied to a phase detector requiring a fourth alternating voltage supply and a suitably adjusted potentiometer. A fifth alternating voltage supply drove a DC supply for various DC actuated components in the circuit. The five alternating supplies above-mentioned were provided by five secondary windings of a toroid transformer.

In general, the latter prior art system has performed satisfactorily. However, such prior system is relatively complex and costly to manufacture, for example in its requirement for plural AC supplies at least some of which are of square wave form. Further, care must be taken in the conjunction and location of the toroid transformer to avoid radiation of magnetic energy therefrom in a manner to interfere with proper operation of other circuit components.

Accordingly, the ojects of the present invention include provision of:

1. A multiplexed strain gauge bridge system, particularly for measuring the load on a load support member by application of strain gauges or the like thereto, and particularly adaptable to measuring the net load carried by a vehicle (such as a truck, wagon, trailer or the like) by monitoring the output of strain gauges carried by the vehicle axles or other load support members thereof.

2. A system, as aforesaid, which avoids the need for multiple alternating voltage particularly multiple square wave supplies, avoids AC bridge circuitry, avoids the need for more than one bridge even to monitor the load on four separate load support members of a given vehicle, and further avoids the need for a bucking voltage supply.

3. A system, as aforesaid, which provides a DC voltage bridge output of low amplitude dependent on the total load carried by the load support members and permits high gain amplification of such small DC bridge output signal to provide a DC output suitable for driving indicating means such as a meter, or the like, while avoiding introduction of temperature dependent offsets in the amplified DC signal despite substantial temperature variation during operation of the system.

4. A system, as aforesaid, which avoids the need for toroid transformers, and avoids incorporation of sources of significant magnetic leakage flux or other similar interference as may introduce nonlinearities in the operation of circuit components.

5. A system, as aforesaid, which provides for time division multiplexing of the DC bridge output signal prior to high gain AC amplification and subsequently provides for demodulation of the resulting amplified square wave signal as a DC signal which is a much amplified version of the DC bridge output signal, and which introduction of significant DC offsets is avoided during multiplexing, amplification and demodulating.

6. A system, as aforesaid, which eliminates the need for a complex phase detection circuit as such, particularly one requiring an AC supply.

7. A system, as aforesaid, of simplified circuitry and reduced current drain.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a strain gauge load measuring system in which a pair of strain gauges are mountable on each of at least one load supporting member. A DC bridge incorporating the strain gauges produces, across a pair of output terminals thereof, a DC signal of amplitude dependent upon an actual load supported by the load support member. A time division multiplexing unit connects across the output terminals of the bridge for producing a square wave voltage of amplitude substantially equal to such load dependent DC signal amplitude. A high gain, AC coupled amplifier amplifies the square wave voltage. A demultiplexing unit responds to the amplitude of the amplified square wave voltage for producing an amplified version of the load dependent DC voltage provided by the bridge. Indicating circuitry responds to the amplified load dependent DC voltage for providing a quantitative indication of the load.

BRIEF DESCRIPTION OF THE DRAWINGS

FIG. 1 is a side elevational view of a load supporting member with a pair of strain gauges attached thereto.

FIG. 2 is a block diagram of the system embodying the invention.

DETAILED DESCRIPTION

Figure 3:
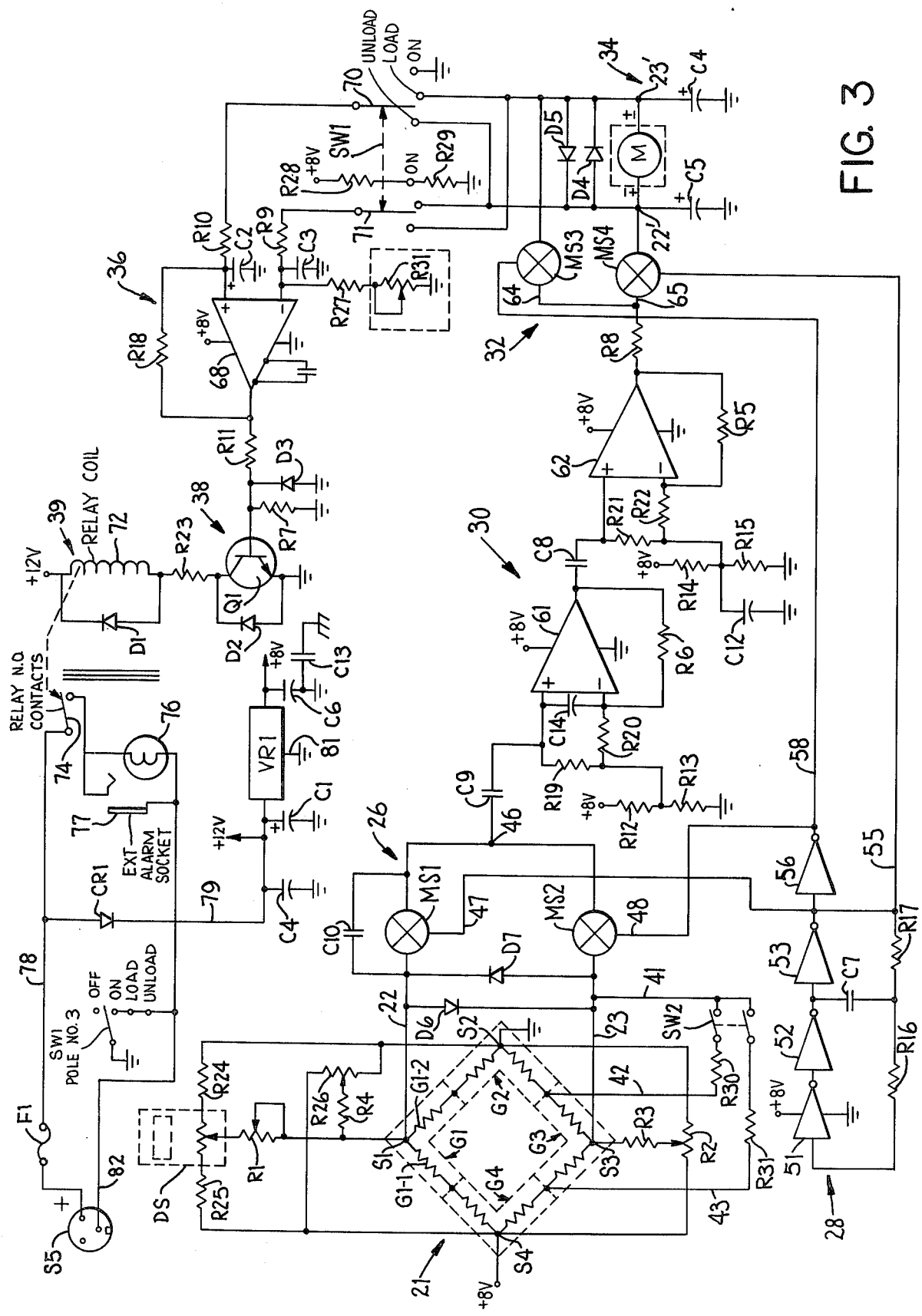
FIG. 3 is a schematic circuit diagram illustrating portions of FIG. 2 in greater detail.

FIG. 1 shows, in side elevation, a portion of a vehicle including a load support member, here an axle 10 supported at one end by a rotatable wheel (not shown) upon which a tire 12 is mounted. The axle 10 supports a vehicle frame member 14. A member 15 is illustrative of the body of the vehicle, which carries the payload.

A pair of strain gauges G1-1 and G1-2 mount on axle 10. The relative impedance of the gauges is a function of the load applied to the axle through member 15. Strain gauge G1-1 is positioned a fixed distance D1 away from the wheel supported end of the axle 10. Strain gauges G1-1 and G1-2 are spaced apart by a fixed distance D2 along axle 10. The strain gauge mounting arrangement immediately above described with respect to FIG. 1 is similar to that of aforementioned U.S. Pat. No. 3,899,924.

FIG. 2 discloses a preferred embodiment of the invention in block diagram form, wherein a DC strain gauge bridge circuit 21, incorporating load sensing strain gauges such as gauges G1-1 and G1-2, connects at its output terminals 22 and 23 to a time division multiplex unit 26. Multiplex unit 26, under the control of a clock circuit 28, alternately connects bridge output lines 22 and 23 to the input of an AC coupled amplifier 30, so as to apply to such AC coupled amplifier a square wave signal of clock frequency and of amplitude equal to the difference between the voltages on bridge output terminals 22 and 23.

The square wave signal, amplified substantially (e.g. 8,000 to 10,000 times) by amplifier 30, is applied to a time division demultiplexer, or demodulator, unit 32 which applies such signal alternately to opposite sides of a null meter M, in cooperation with a low pass filter circuit generally indicated at 34. Switching of demultiplexer unit 32 is controlled by clock 28 in synchronism with switching of multiplex unit 26. The voltage appearing across meter M is a substantially amplified version of the DC potential across output lines 22 and 23 of the bridge 21. If the bridge is balanced with no load on the vehicle, such that the reading of meter M is zero, the bridge output, and hence the voltage across meter M, will be proportional over a short range centered around the null to a load applied to the vehicle, for example a load of grain on a grain wagon. By applying the voltage across meter M to a DC voltage comparator, and appropriately adjusting a voltage divider for one of the inputs, the comparator can be made to actuate, through a relay driver 38, an alarm relay 39, when during loading (or unloading) the weight of the load carried by the vehicle passes through a desired threshold value determined by the adjustable voltage divider.

A preferred embodiment of the invention is shown in more detail in FIG. 3. The bridge 21 comprises a resistance bridge of four legs connected in series loop with adjacent legs joined at the apices S1-S4. Strain gauges G1-1 and G1-2 of the strain gauge pair G1 connect in series at any desired apex, here apex S1. Bridge 21 may incorporate, in series loop, the strain gauges of four separate strain gauge pairs G1-G4, forming the respective apices S1-S4 and wherein each leg of the bridge (e.g. leg S1, S2) is made of one strain gauge each of two adjacent pairs of strain gauges as shown. Thus, bridge 21 may include the strain gauge pairs for four separate load support members 10 (e.g. axles, wagon tongues, etc.) of a load carrying vehicle. Where a given vehicle has less than four load support members, for example three, the missing strain gauge pair (as at G4), or pairs, may be replaced by ordinary resistors of appropriate value. While in the present discussion reference is made to use of the system for monitoring of the load carried by a vehicle, other uses of the inventive system are contemplated within the broader aspects of the invention.

Bridge 21 is energized from a positive DC supply hereafter described, diagonally opposed apices S2 and S4 of the bridge being respectively connected to the ground and a positive potential line 8V of such DC supply. Accordingly, the remaining diagonally opposed apices S1 and S4 of the bridge form the bridge DC signal output terminals and connect to aforementioned output lines 22 and 23, respectively.

To balance the bridge 21, such that the output potential across lines 22 and 23 is zero when no payload is carried by the vehicle, i.e. with just the weight of the vehicle body 15 present on the support members 10, coarse and fine adjustment potentiometers R2 and R26 are provided. Coarse adjustment potentiometer R2 connects across DC supply terminals S2 and S4 of bridge 21 and its slider is connected through a resistor R3 to an output terminal (here terminal S3) of the bridge. Similarly, fine adjust potentiometer R26 connects across DC input terminals S2 and S4 and has its slider connected by a resistor R4 to an output terminal (here terminal S1) of the bridge. To provide the desired finer adjustment, elements R26 and R4 have, respectively, substantially smaller and substantially larger resistance values than corresponding elements R2 and R3 and resistance R4 has a much higher resistance value (for example 2 meg ohm) than potentiometer R26 (e.g. 10 k ohm). Resistors R3 and R4 are preferably precision (1%) resistors.

A voltage selector, or digital resistance selection switch, DS, which may be similar to the voltage selector 38 of aforementioned U.S. Pat. No. 3,899,924, is connected by series coarse calibrating resistors R24 and R25 to bridge DC input terminals S2 and S4, respectively, and has its resistance selection member coupled through a fine calibrating variable resistor R1 to an output terminal (here terminal S1) of bridge 21. Preferably, switch DS is of a type capable of stepwise resistance adjustment and having a readout portion (not shown) providing a direct reading, in pounds or other desired weight units, in correspondence to its adjustment of its slider. By substituting the calibration resistors R24 and R25 with different values, readings displayed by switch DS can be interpreted in different units of weight (e.g. 10,000 pounds units, kilogram units, 20,000 pound units, etc.). The display on switch DS can be made to represent the payload carried by the vehicle, as hereafter discussed. For convenience in illustration, resistance switch DS is shown in FIG. 3 simply as a potentiometer.

If desired, a test circuit may be provided for checking strain gauges in the bridge for proper operation. As here shown, such test circuit comprises a double pole, single throw switch SW2 with contacts connected on the one hand to intermediate point S3 of strain gauge pair G3 and, on the other hand, through parallel precision (0.1%) resistors R30 and R31 to the ends of resistance strain gauge pair G3. Thus, closure of switch SW2 applies known resistors R30 and R31 to the bridge circuit in the place normally occupied by the strain gauges of strain gauge pair G3. Test resistors R30 and R31 preferably have resistance values close to the nominal resistance value of the strain gauges. Conveniently, the bridge 21 may be formed as a series of appropriately interconnected sockets on a supporting board, which receives plugs on the ends of remote leads from the strain gauges. Similarly, lines 41, 42 and 43, terminating switch SW2 and resistors R30 and R31 as shown, may be inserted in substitution for any desired one of the strain gauge pairs G1-G4.

Time division multiplex unit 26 comprises a pair of analog switches MS1 and MS2 alternately actuable to connect respective bridge output lines 22 and 23 to the input 46 of AC coupled amplifier 30. The input of amplifier 30 is AC coupled through a capacitor C9. In the preferred embodiment shown, switches MS1 and MS2 are CMOS analog switches available for example in a four switch package from Texas Instruments, of Dallas, Texas, under model No. TP4016. These are complementary symmetry MOS devices basically resistive in character. Each switch MS1 and MS2 acts as a voltage controlled resistor switchable between a substantially zero resistance and a very high resistance (for practical purposes, approaching infinity) and interposed between the respective one of bridge output lines 22 and 23, on the one hand, and the amplifier input point 46 on the other hand. Control voltage is ultimately applied to switches MS1 and MS2 through control input lines 47 and 48 from the clock circuit 28.

Since each switch MS1 and MS2 is feeding into an AC coupled amplifier (i.e. is feeding into a capacitor C9, a high impedance to DC), only very small current flows when both inputs are equal in amplitude, and consequently there is very little voltage drop across the resistive devices MS1 and MS2. Accordingly, any change in the resistance of switches MS1 and MS2 has very little effect on performance of the system in view of the very small current flow therethrough when the bridge is balanced. The same comments apply to similar switches MS3 and MS4 provided in the time division demultiplexer unit 32, hereinafter described.

Multiplexer unit 26 further includes a pair of oppositely directed diodes D6 and D7 connected across DC bridge output lines 22 and 23 ahead of switches MS1 and MS2. These protective diodes shunt relatively high transient noise voltages, as may appear across the bridge output terminals S1 and S3, and thus prevent application thereof to the analog switches MS1 and MS2. Diodes D6 and D7 are inexpensive rectifier diodes (e.g. 1N914 types) but in this instance substitute for Zener voltage limiting diodes. More particularly, whereas the normal signal voltage across bridge output lines 22 and 23 may be in the microvolt or low millivolt range, the forward breakover voltage of diodes D6 and D7 is considerably higher, near one volt. Accordingly, voltage spikes of higher potential, as may be induced for example in the leads between the axle mounted strain gauges and the remotely located remaining bridge circuit, are shunted before reaching switches MS1 and MS2.

Capacitor C10 was provided to balance such voltage spikes as might be produced by switching of the analog switches MS1 and MS2. Usually this is not a problem however and capacitor C10 normally is omitted.

Clock unit 28 is a conventional square wave generator, here of one kHz output frequency, for example. Clock 28 here comprises an inverting amplifier (invertor) 51 driving a further invertor 52 having its output connected in a positive feedback loop through an RC timing network, comprising a series capacitor C7 and resistor R16, to the input of inverting amplifier 51. A third invertor 53 is driven by invertor 52 and has capacitor C7 and a further resistor R17 connected across its input and output terminals to complete the basic one kHz square wave oscillator. The oscillator square wave output is applied by invertor 53 to the control input line 47 of analog MS1 and also to a control input line 55 of one of the analog switches of demultiplexing unit 32, here switch MS4, such that switches MS1 and MS4 conduct in synchronism. A further invertor 56 also driven by invertor 53, applies the square wave signal, 180° out of phase with the output of oscillator invertor 53, to control input line 48 of analog switch MS2 and to a further control input line 58 of remaining analog switch MS3 of the demultiplexer unit 32, so that switches MS2 and MS3 switch in synchronism.

The AC coupled amplifier 30 comprises a pair of operational amplifiers 61 and 62 with the output of the former coupled to the noninverting input of the latter through a coupling capacitor C8. The noninverting input of first amplifier 61 receives the square wave output from analog switches MS1 and MS2 through AC coupling capacitor C9. The amplitude of such square wave corresponds to the voltage drop between bridge output terminals S1 and S3. A capacitor C14 connected across the inputs of amplifier 61 suppresses any radio frequency (RF) components in the input to operational amplifier 61. To provide DC operating bias to the inputs of amplifier 61, a voltage divider comprising series resistors R12 and R13 connects between positive potential line 8V and ground. The DC voltage from the midpoint of the voltage divider is applied through preferably identical precision (1%) resistors R19 and R20 to the noninverting and inverting inputs of amplifier 61. A feedback resistor R6 connects the output of amplifier 61 to the inverting input thereof, and in cooperation with resistor R20 sets the gain of the amplifier.

The amplified square wave output of operational amplifier 61 is coupled through capacitor C8 to the noninverting input of operational amplifier 62. As with amplifier 61, amplifier 62 is provided with an input biasing network comprising voltage divider resistors R14 and R15 connected between positive potential line 8V and ground and supplying therebetween a DC bias voltage through further preferably precision resistors R21 and R22 to the noninverting and inverting inputs of amplifier 62. Also, a feedback resistor R5 coupled across the output and inverting input of amplifier 62, together with input resistor R22, determines the gain of amplifier 62. Substituting differently valued resistors at R5, varies the overall gain of AC coupled amplifier 30 in a preselected manner, and therefore compensates for differences in sensitivity of different types of load measuring transducers.

A capacitor C12 connecting the midpoint of divider R14, R15 to ground, acts as a filter capacitor to prevent the incoming square waves applied to the noninverting input of amplifier 62 from reaching the inverting input thereof and thereby unintentionally reducing the gain of operational amplifier 62. The AC coupled amplifier 30 comprising operational amplifiers 61 and 62, is a very high gain AC amplifier, the gain being selectable and typically lying in the range of 8,000 to 10,000, thereby permitting the following circuitry, including meter M, to be driven in a usable manner by the very low output voltage levels from bridge output lines 22,23.

A current limiting resistor R8 couples the square wave output from AC coupled amplifier 30 to the input lines 64 and 65 of analog switches MS3 and MS4 of demultiplexer unit 32. In response to the one kHz square wave clock signal on control input lines 58 and 55, the switches MS3 and MS4 alternately apply the corresponding voltage extremes of the amplified bridge output signal square wave voltage appearing in lines 64 and 65, to the opposite sides of meter M. More particularly, as multiplexing switch MS1 applies the voltage on input line 22 to the amplifier 30, corresponding demultiplexing switch MS4 applies the amplified version of that voltage to the left side of meter M. This charges a capacitor C5 connected to the left side of the meter to temporarily store the high gain amplified version of the voltage on the bridge output line 22. Similarly, and in the next half cycle of the one kHz control signal from clock 28, as the then conducting multiplexing switch MS2 applies the voltage on opposite bridge output line 23 to amplifier 30, corresponding demultiplexing switch MS3 applies the amplified version of that voltage to the right side of meter M. This charges a further capacitor C4 connected between the right side of the meter and ground to temporarily store such amplified voltage. Capacitors C4 and C5 are preferably of the same value and together comprise the low pass filter unit 34 above-described.

Thus, during one half cycle of clock 28, the voltage across meter M is the difference between the voltage then being applied through conductive switch MS4 to capacitor C5 and the voltage previously stored on capacitor C4 by previously conductive switch MS3. On the next half cycle of the clock 28, the voltage across meter M is that then being applied to capacitor C4 by conductive switch MS3 and the voltage previously applied to capacitor C5 by previously conductive switch MS4. In view of the synchronism of switches MS3, MS4 with switches MS2, MS1, the result is a DC voltage across meter M input terminals 22', 23' which is a highly amplified reproduction of the DC bridge output voltage across lines 22, 23.

Oppositely oriented diodes D4 and D5 connect in parallel across meter M to protect same by shunting over-voltage spikes therearound. The diodes have forward breakover voltages selected so that they do not affect normal amplified signal voltages applied across the meter M.

To the extent above described, the FIG. 3 apparatus suffices, for example, to provide at the indicator of digital readout switch DS, the weight of the actual load carried by the vehicle at a given time, as hereafter described. On the other hand, the further circuitry units at 36, 38 and 39 provide the additional capability of signaling when, during loading or unloading, the load value has passed through a preselected value or threshold.

More particularly, comparator unit 36 comprises an operational amplifier 68. The noninverting and inverting inputs of amplifier 68 connect through respective input resistors R10 and R9 to movable contacts 70 and 71, respectively, of a load-unload switch SW1. Conveniently switch SW1 includes a double pole, triple throw contact set as shown in FIG. 3, its movable contacts 70 and 71 being simultaneously shiftable between ON, LOAD and UNLOAD fixed contacts. Movable contacts 70 and 71 are shown closest to the LOAD fixed contacts and when engaging same connect the outputs of demultiplex switches MS3 and MS4 through resistors R10 and R9, respectively, to the noninverting and inverting inputs, respectively, of amplifier 68. Switch SW1 in its UNLOAD position reverses the connections of the demultiplex unit switches such that the outputs of demultiplex switches MS3 and MS4 connect through input resistors R9 and R10, respectively to the inverting and noninverting inputs, respectively, of amplifier 68. In addition, switch SW1 has a third (ON) position in which its movable contacts 70 and 71 connect respectively to ground and the midpoint of a voltage divider comprising series resistors R28 and R29 connected between positive supply line 8V and ground. The ON position is provided for weighing only. The operational amplifier 68 is biased off by resistors R28 and R29 connected to its inverting input and the connection of ground to its noninverting input.

Operational amplifier 68 acts as a comparator with hysteresis provided from a positive feedback resistor R18 coupled from its output to its noninverting input. A voltage divider including a series resistor R27 and potentiometer R31 connects the inverting input of amplifier 68 to ground, potentiometer R31 being adjustable to determine the input voltage level at which operational amplifier 68 will energize relay driver 38. Capacitors C2 and C3 connect respective inputs of operational amplifier 68 to ground and act to shunt high noise spikes and other non-DC voltage components to ground to prevent premature triggering of operational amplifier 68.

The output of operational amplifier 68 is applied through a current limiting resistor R11 to the base of a transistor Q1 which defines the relay driver 38. A diode D3 and a resistor R7, both connected between the transistor base and ground, respectively protect against negative voltage transients and set the DC base bias on the transistor Q1. A diode D2 connects in reversed polarity orientation across the collector-emitter junction of transistor Q1 to protect against inductive kickback from the relay coil hereafter described.

Relay driver transistor Q1 has its collector-emitter path connected in series with a voltage dropping resistor R23 and the coil 72 of relay 39 between a nonregulated positive potential line 12V and ground. In the particular embodiment shown, the relay coil 72 is for convenience a 9 volt coil used with a 12 volt supply, the resistor R23 limiting the voltage drop across the coil to permit its safe use. A further diode D1 connected across the coil 72 in inverted polarity orientation provides further protection against inductive kickback from the relay coil.

Energization of the relay coil 72, by conduction of transistor Q1, closes a normally open relay contact 74. Closure of relay contact 74 energizes an alarm lamp 76 which, if desired, may be paralleled by a connector socket 77 for an audible external alarm, or the like, not shown. More particularly, relay contact 74 connects in series with lamp 76 and a protective fuse F1 across a conventional DC supply connector S5, which may be a part of a conventional plug and socket connection to, for example, the usual 12 volt storage battery in the electrical system of a truck, trailer towing tractor, or the like.

DC operating potential is applied, as follows, to the FIG. 3 circuitry above-described. Positive potential is taken from the positive supply of connector S5 through fuse F1 and relay supply line 78 via a positively oriented diode CR1 to a line 79. A diode CR1 protects line 79 from spurious wrong polarity voltages, such that in the particular embodiment shown, line 79 is held substantially at a positive 12 volts. Capacitors C4 and C1 filter high frequency transients to ground. The line 79 supplies aforementioned positive potential line 12V and also drives a conventional three terminal voltage regulator VR1, which is grounded at 81 and here supplies a regulated positive 8 volt potential on positive potential line 8V above mentioned. Further filtering to ground of spurious high frequency voltage components is carried out by connection of line 8V through a capacitor C6 to ground and connection of circuit ground through a further capacitor C13 to the chassis of the load carrying vehicle. On-off control of the FIG. 3 circuit is readily achieved by connection of the ground side 82 of DC supply connector S5 to circuit ground through suitable on-off switch, which in the particular embodiment shown is a further contact of aforementiond LOAD-UNLOAD switch SW1.

While the operation of the system will be clear from the above description, same will be briefly summarized for convenient reference below. With DC potential supplied at lines 12V and 8V, digital resistance switch DS is set to indicate zero weight, and coarse and fine potentiometers R2 and R26 are adjusted to zero the meter M. Such is done with no load on the vehicle and serves to eliminate the effect of nonload weights, such as that of the vehicle body, from subsequent load determinations. Thereafter, a load may be applied to the vehicle and the weight of the load read from the indicator of digital weight indicating switch DS by adjusting the slider of the latter in the direction and to the extent required to zero the meter M once again.

To indicate that a desired load weight threshold has been reached during loading of the vehicle, contacts 70 and 71 of switch SW1 are set to their LOAD positions indicated in FIG. 3. With potentiometer R31 properly adjusted, the increasing load weight raises the potential at meter input point 23' and thus at the noninverting input of operational amplifier 68, such that when the preselected load threshold is reached, the operational amplifier 68 is triggered and energizes transistor Q1, relay coil 72 and hence alarm elements 76 and 77, indicating that the vehicle has been loaded to the desired limit.

Similarly, when it is desired to remove a portion of the load from the vehicle to bring the load weight down to a threshold value, contacts 70 and 71 of switch SW1 are shifted to their UNLOAD position. Thus, as portions of the load are removed and load weight decreases the potential at meter input point 22' swings positive and eventually reaches a value sufficient to again trigger the operational amplifier 68 at its noninverting input and turn on transistor Q1, relay coil 72 and hence alarm elements 76 and 77.

While providing substantial circuit simplification and permitting direct energization of the system from a conventional vehicle storage battery, without need for elaborate AC supplies and transformers, the single DC strain gauge bridge does provide a relatively low voltage output amplitude, requiring very substantial amplification in order to provide the desired DC signal level at meter M and to drive alarm amplifier 68. Even the better, quite expensive high gain DC operational amplifiers, of which I am aware, are subject to substantial voltage offsets, or voltage drift, with temperature. Input offset drift on the order of half a microvolt per degree C or greater is not unusual. With a 20° C. temperature change, over a period of operation, and a typical change in bridge signal on the order of a half microvolt per pound, a 20° C. change in temperature could provide a 20 pound error in load reading.

This problem of DC drift is eliminated by the use of the AC coupled amplifier, at 30, in combination with the multiplexing and demultiplexing units 26 and 32. In view of the AC coupling, DC voltage offsets are not a factor. More particularly, the AC coupled amplifier 30 alternately amplifies the voltage at upper bridge output S1 and lower bridge output S3 and any temperature induced DC drift, or DC voltage offset, produced in amplifying one such voltage could also be produced in amplifying the other. Since the meter M sees only the difference between the two amplified voltages, the identical DC offsets in the two voltages have no effect on the meter reading.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A load measuring system, comprising:
a DC bridge circuit having DC excitation means for producing across a pair of output terminals of said bridge circuit a DC signal of amplitude dependent upon a load supported by a load-support member;
time division multiplexing means connected across said output terminals of said bridge circuit for producing a square wave voltage of amplitude substantially equal to said load dependent DC signal amplitude;
high gain, AC coupled amplifier means for amplifying said square wave voltage;
demultiplexing means responsive to the amplitude of said amplified square wave voltage for producing an amplified version of said load dependent DC voltage; and
indicating means responsive to said amplified load dependent DC voltage for providing an indication of said load.

2. The system of claim 1, in which said time division multiplexing means comprises first and second switch means connected in series across said pair of output terminals of said bridge circuit means, means connecting the input of said AC coupled amplifier means between said first and second switch means, and clock means connected for rendering said first and second switch means alternately conductive and therewith alternately applying to the input of said AC coupled amplifier means the voltage levels appearing at the corresponding ones of said output terminals of said bridge circuit means.

3. The system of claim 2, in which said demultiplexing means comprises third and fourth switch means connected in series across a portion of said indicating means, the output of said AC coupled amplifier means being connected to apply said square wave voltage to said third and fourth switch means, and storage means connected to the output of each of said third and fourth switch means to store the output voltage level of the corresponding third or fourth switch means while the other of said third or fourth switch means is conducting, said indicating means being connected across said storage means.

4. The system of claim 3, in which said first through fourth switch means each comprise an electronic device having a control electrode controlled by said clock means for switching such device and a substantially resistive path switchable between a substantially zero resistance conductive state and a high resistance nonconductive state, said storage means comprising a pair of capacitors respectively connected to the outputs of the third and fourth switching means, as well as to opposite sides of said indicating means.

5. The system of claim 4, in which said first through fourth switching means comprise CMOS analog switches.

6. The system of claim 2, in which said clock means comprises RC timed oscillator having a first frequency signal output connected to a control input of one of said first and second switch means and an invertor connected between said oscillator output and the control input of the other of said first and second switch means.

7. The system of claim 1, in which said DC bridge circuit means comprises four resistance legs connected in series loop, each two adjacent legs joining at an apex, each leg comprising a pair of resistance segments in series, a pair of strain gauges being the adjacent resistance segments of an adjacent pair of legs and joining at one said apex, said DC excitation means comprising one diagonally opposed pair of said apices to which a DC power source connects, said output terminals being the remaining diagonally opposed pair of said apices and thereby feeding said time division multiplexing means, said DC bridge circuit means further including variable resistance means interposed between the power supply apices and a said output terminal and actuable for zeroing the output voltage across said output terminals with only a residual load on said load-supporting member, and a further variable resistance means connected to said DC power supply apices and a said output terminal, said further variable resistance means being of the type having a read-out in desired units of load, and being actuable to zero the voltage across said output terminals while reading out units of an additional load superposed on said residual load on said load-supporting member.

8. The system of claim 7, in which said further variable resistance means comprises a digital read-out, resistance switching unit and calibration resistors connecting said power supply apices thereto for direct read-out of said additional load quantity in particularly desired units, such as pounds, kilograms and the like.

9. The system of claim 8, in which said load-supporting member comprises a vehicle with plural load-supporting axles, and a pair of said strain gauges on ones of said plural axles, at least the majority of bridge apices being formed by pairs of resistance segments which are each a pair of said strain gauges, said residual load being the weight of unloaded vehicular structure supported by said axles, said additional load being the useful load carried by the vehicle, the load monitoring strain gauges of a given vehicle being interconnected in a single said DC bridge.

10. The system of claim 1, in which said demultiplexing means comprises a pair of switches and means for turning same on and off in alternation, said indicating means being connected across the outputs of said pair of demultiplexing switches, said demultiplexing means further including storage means at the output of each said demultiplexing switch for receiving a voltage value while its corresponding demultiplexing switch is conductive and holding such voltage value while the other demultiplexing switch is conductive, such that said indicating means sees a potential difference between said storage means which is an amplified version of the DC voltage across said output terminals of said bridge circuit means, an operational amplifier having noninverting and inverting input terminals and a reversing switch actuable to connect said terminals of said operational amplifier to said outputs of said demultiplexing switches, said reversing switch having a load position connecting said demultiplexing switch outputs to said operational amplifier input terminals in one order so as to trigger said operational amplifier when the load on said load support means increases beyond a preset value, said reversing switch having an unload position in which it reverses the connection of said demultiplexing switches to said input terminals of said operational amplifier for triggering the latter when the load on said load-supporting member falls below a preset value.

11. The system of claim 10, in which said indicating means further includes an alarm relay means and a single transistor responsive to the output of said operational amplifier for triggering said relay means.

12. A load measuring system, comprising:
DC circuit means for producing across its output terminals a DC signal of amplitude dependent upon a load supported by a load-support member;
time division multiplexing means connected across said output terminals of said DC circuit means for producing an alternating voltage of amplitude substantially equal to said load dependent DC signal amplitude;
high gain, AC coupled amplifier means for amplifying said alternating voltage;
demultiplexing means responsive to the amplitude of said amplified alternating voltage for producing an amplified version of said load dependent DC voltage; and
means responsive to said amplified load dependent DC voltage for providing an indication of said load.

13. A load measuring system, comprising:
a DC energized bridge having first and second output terminals and arms including strain gauge means, said arms being connected to said output terminals, said bridge being energizable for producing a DC output voltage across said first and second bridge output terminals and dependent upon a load supported by a load support member;
a high gain, AC coupled amplifier having an input terminal and an output terminal;
multiplexing means actuable for switching said first and second bridge output terminals alternately to said input terminal of said AC coupled amplifier at a preselected frequency, so that said AC coupled amplifier alternatingly amplifies the voltage levels at said first and second output terminals of said bridge;
load means having first and second terminals and responsive to the difference between voltage levels applied alternatively to said first and second terminals;
demultiplexing means actuable at said frequency and in synchronism with said multiplexing means for transferring amplified versions of said voltage levels at said first and second bridge output terminals from the output terminal of said AC coupled amplifier alternately to respective ones of said terminals of said load means;
whereby to produce across first and second terminals of said load means a DC signal which is an amplification of said DC output voltage of said DC bridge.

* * * * *

UNITED STATES PATENT AND TRADEMARK OFFICE
CERTIFICATE OF CORRECTION

PATENT NO. : 4 155 263
DATED : May 22, 1979
INVENTOR(S) : Robert G. Frantz

It is certified that error appears in the above—identified patent and that said Letters Patent are hereby corrected as shown below:

Column 1, line 43; change "conjunction" to ---construction---.

Column 1, line 47; change "ojects" to ---objects---.

Column 4, line 35; change "pounds" to ---pound---.

Column 5, line 59; change "analog MS1" to ---analog switch MS1---.

Signed and Sealed this

Seventh Day of August 1979

[SEAL]

Attest:

Attesting Officer

LUTRELLE F. PARKER
*Acting Commissioner of Patents and Trademarks*